(12) United States Patent
Ueki (10) Patent No.: US 7,231,841 B2
(45) Date of Patent: Jun. 19, 2007

(54) OPERATING MECHANISM FOR RECIPROCATING COMPONENT

(75) Inventor: Yasushi Ueki, Yokohama (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 11/124,079

(22) Filed: May 9, 2005

(65) Prior Publication Data

US 2005/0252317 A1 Nov. 17, 2005

(30) Foreign Application Priority Data

May 12, 2004 (JP) .............................. 2004-142284

(51) Int. Cl.
*F16H 27/02* (2006.01)
(52) U.S. Cl. .................. 74/89.17; 74/89.19; 74/29
(58) Field of Classification Search ............... 74/89.17, 74/89.19, 27, 29; 185/9, 37
See application file for complete search history.

(56) References Cited

U.S. PATENT DOCUMENTS 6,073,395 A * 6/2000 Fenelon ........................ 49/358
6,820,369 B2 * 11/2004 Fenelon ........................ 49/349
7,140,151 B2 * 11/2006 Spaziani et al. .............. 49/349

FOREIGN PATENT DOCUMENTS

| DE | 20 2004 011 916 | 12/2004 |
| EP | 1 396 212 | 3/2004 |
| GB | 2 042 872 | 10/1980 |
| JP | 2002-29323 | 1/2002 |
| JP | 2002-216412 | 8/2002 |
| JP | 2003-40023 | 2/2003 |
| JP | 2004-203067 | 7/2004 |

* cited by examiner

*Primary Examiner*—Richard Ridley
*Assistant Examiner*—James Pilkington
(74) *Attorney, Agent, or Firm*—Manabu Kanesaka (57) ABSTRACT

An operating mechanism for a reciprocating component includes a moving member having a mounting section for attaching the reciprocating component, and a base with a guide. The guide has a backward path guide section and a forward path guide section that faces the backward path guide section. The moving member accumulates a backward travel force while being guided by the backward path guide section and moved to a mid point in the backward operation, and fully moves back by releasing the accumulated travel force from the mid point. The moving member accumulates a forward travel force while being guided by the forward path guide section and moved to a mid point from the fully moved back position in the forward operation, and fully moves forward by releasing the accumulated travel force from the mid point.

1 Claim, 12 Drawing Sheets

OPERATING MECHANISM FOR RECIPROCATING COMPONENT

CROSS REFERENCE TO RELATED APPLICATION

The disclosure of Japanese Patent Application No. 2004-142284, filed on May 12, 2004, is incorporated in the application.

BACKGROUND OF THE INVENTION AND RELATED ART STATEMENT

The present invention relates to an operating mechanism for an object to be moved back and forth.

An accessory container includes a flexible sliding cover moving between an advanced position for closing an opening and a retreated position for opening the opening, and a driving device for applying a travel force to the sliding cover in the advanced position toward the retreated position (See Patent Reference 1).

In such an accessory container, the sliding cover is automatically retreated (backward operation) with the driving device by releasing an engagement of a latch relative to a front end of the sliding cover. However, in a returning operation in which the fully retreated sliding cover is advanced again (forward operation), it is necessary to pull the sliding cover manually while allowing a spring of the driving device to accumulate a force.

Patent Reference 1: Japanese Patent Application No. 2002-371199.

A major problem to be addressed by the present invention is enabling a reciprocating component to travel automatically within a certain range in not only the backward operation but also the forward operation.

Further objects and advantages of the invention will be apparent from the following description of the invention.

SUMMARY OF THE INVENTION

In order to solve the aforementioned problems, according to the present invention, an operating mechanism for a reciprocating component is provided with the following features (1) to (5):
(1) The operating mechanism includes a moving member having a mounting section for attaching the reciprocating component, and
(2) a base with a guide for the moving member.
(3) The guide of the base has a backward path guide section and a forward path guide section that faces the backward path guide section.
(4) The moving member accumulates a backward travel force while being guided by the backward path guide section and moved to a mid point in the backward operation, and fully moves back by releasing the accumulated travel force from the mid point.
(5) The moving member accumulates a forward travel force while being guided by the forward path guide section and moved to a mid point from the fully moved back position in the forward operation, and fully moves forward by releasing the accumulated travel force from the mid point.

With the above construction, the moving member in the fully moved forward position is allowed to gradually accumulate the backward travel force when the backward operation of the moving member is initiated by grasping or catching the reciprocating component attached to the moving member with a finger. The moving member moves automatically from the mid point in the backward operation by releasing the travel force, thereby allowing the reciprocating component to move back automatically from the mid point in the backward operation.

The moving member in the fully moved back position is allowed to gradually accumulate the travel force in the forward direction when the forward operation of the moving member is initiated by grasping or catching the reciprocating component attached to the moving member is with a finger. The moving member moves automatically from the mid point in the forward operation by releasing the travel force, thereby allowing the reciprocating component to move forward automatically from the mid point in the forward operation.

According to the present invention, the moving member may have a first gear, a second gear engaging the first gear to rotate in reverse through forward rotation of the first gear, and a accumulating device for accumulating a rotational force to rotate the second gear forward through the reverse rotation of the second gear. The backward path guide section of the base has a backward path accumulation zone for engaging only the first gear and a backward path release zone located ahead of the backward path accumulation zone for engaging only the second gear. The forward path guide section of the base has a forward path accumulation zone for engaging only the first gear and a forward path release zone located ahead of the forward path accumulation zone for engaging only the second gear.

With the construction, the moving member in the fully moved forward position can be manually moved to an end of the backward path accumulation zone in the backward path guide section, thereby allowing the accumulating device to accumulate the rotational force. After passing the backward path accumulation zone, the second gear is allowed to move along the backward path release zone with the rotational force accumulated in the accumulating device, thereby allowing the moving member to automatically move back fully.

The moving member in the fully moved back position can be manually moved to an end of the forward path accumulation zone in the forward path guide section, thereby allowing the accumulating device to accumulate the rotational force. After passing the forward path accumulation zone, the second gear is allowed to move along the forward path release zone with the rotational force accumulated in the accumulating device past the forward path accumulation zone, thereby allowing the moving member to automatically move forward fully.

According to the present invention, the moving member may be rotatably attached to the reciprocating component using a mounting section of the moving member, so that rotational centers of the first gear and the second gear swing about a rotatably attached position. The base is provided with a backward-to-forward path switching rack section at the backward path terminal of the guide thereof for abutting against and engaging the second gear at a position where the moving member is fully moved back, so that the engagement between the backward path release zone and the second gear is released and the first gear swings in a direction to engage the forward path accumulation zone through the forward rotation of the second gear. The base is also provided with a forward-to-backward path switching rack section at the forward path terminal of the guide thereof for abutting against and engaging the second gear at the position where the moving member is fully moved forward, so that the engagement between the forward path release zone and the second gear is released and the first gear swings in a direction to engage the backward path accumulation zone through the forward rotation of the second gear.

With the construction, the moving member in the fully moved back position can be situated to be moved forward by the subsequent forward operation. The moving member in the fully moved forward position can be situated to be moved back by the subsequent backward operation.

According to the present invention, the moving member may have a damping gear for receiving a damping force to rotation thereof, and a third gear engaging the damping gear and the second gear. With this construction, it is possible to dampen the forward rotation of the second gear by releasing the rotational force accumulated in the accumulating means, thereby appropriately dampening the backward and forward operations of the moving member through the forward rotation of the second gear.

It may be constructed such that the second gear rotates once or more, while the first gear rotates once.

With this construction, the reverse rotation of the second gear is made greater than the forward rotation of the first gear through the engagement with the backward path accumulation zone and forward path accumulation zone, thereby allowing the accumulating device to efficiently accumulate the rotational force. As a result, lengths of the backward path accumulation zone and the forward path accumulation zone can be minimized.

According to the operating mechanism for a reciprocating component of the present invention, during the backward operation of the reciprocating component, the reciprocating component can fully move backward on its own once it is manually moved back to a certain extent. During the forward operation of the reciprocating component, the reciprocating component can fully move forward on its own once it is manually moved forward to a certain extent.

DETAILED DESCRIPTION OF PREFERRED EMBODIMENTS

Hereunder, embodiments of the present invention will be explained with reference to FIGS. 1 to 12.

Figure 1:
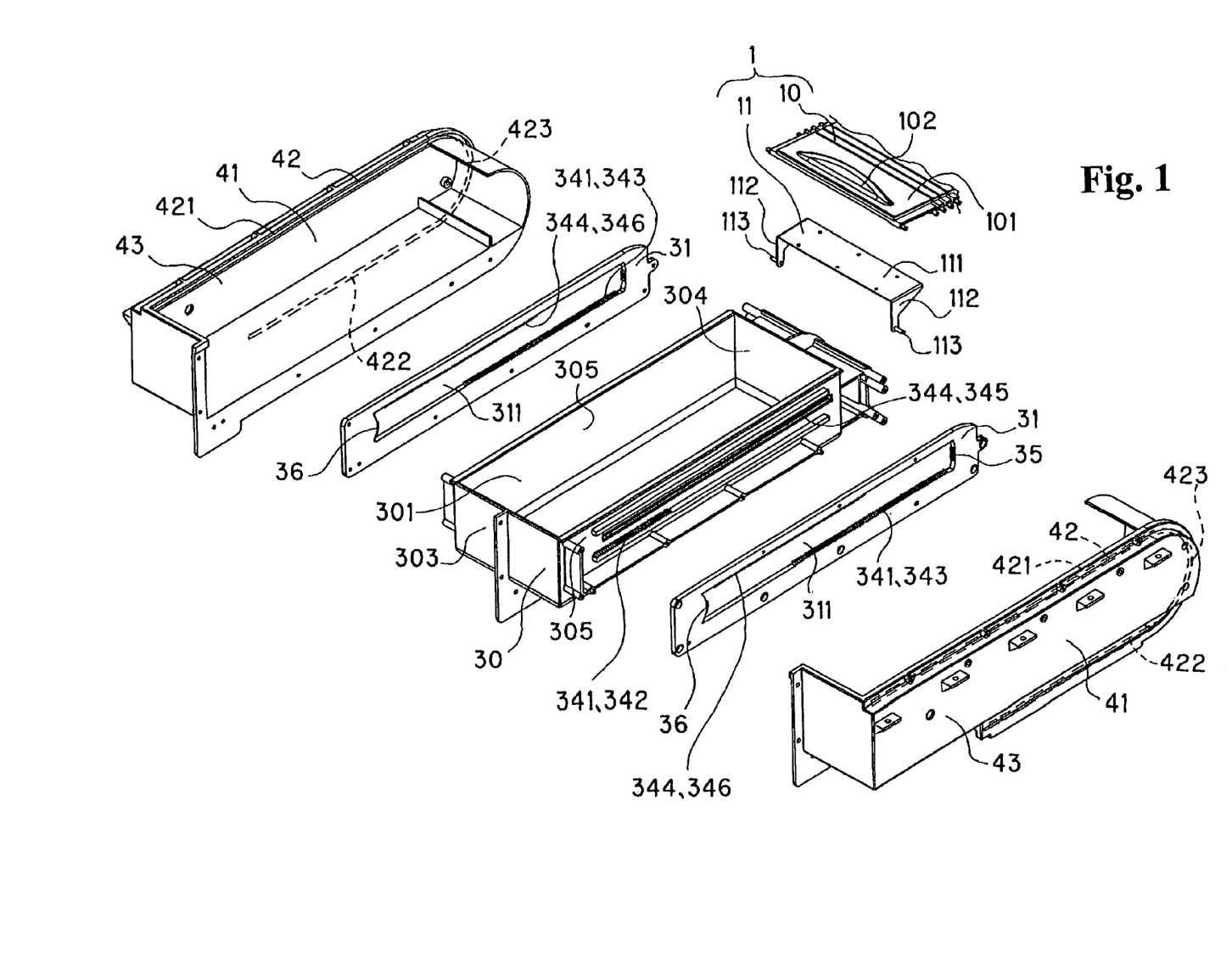
FIG. 1 is an exploded perspective view showing an operating mechanism.
Figure 2:
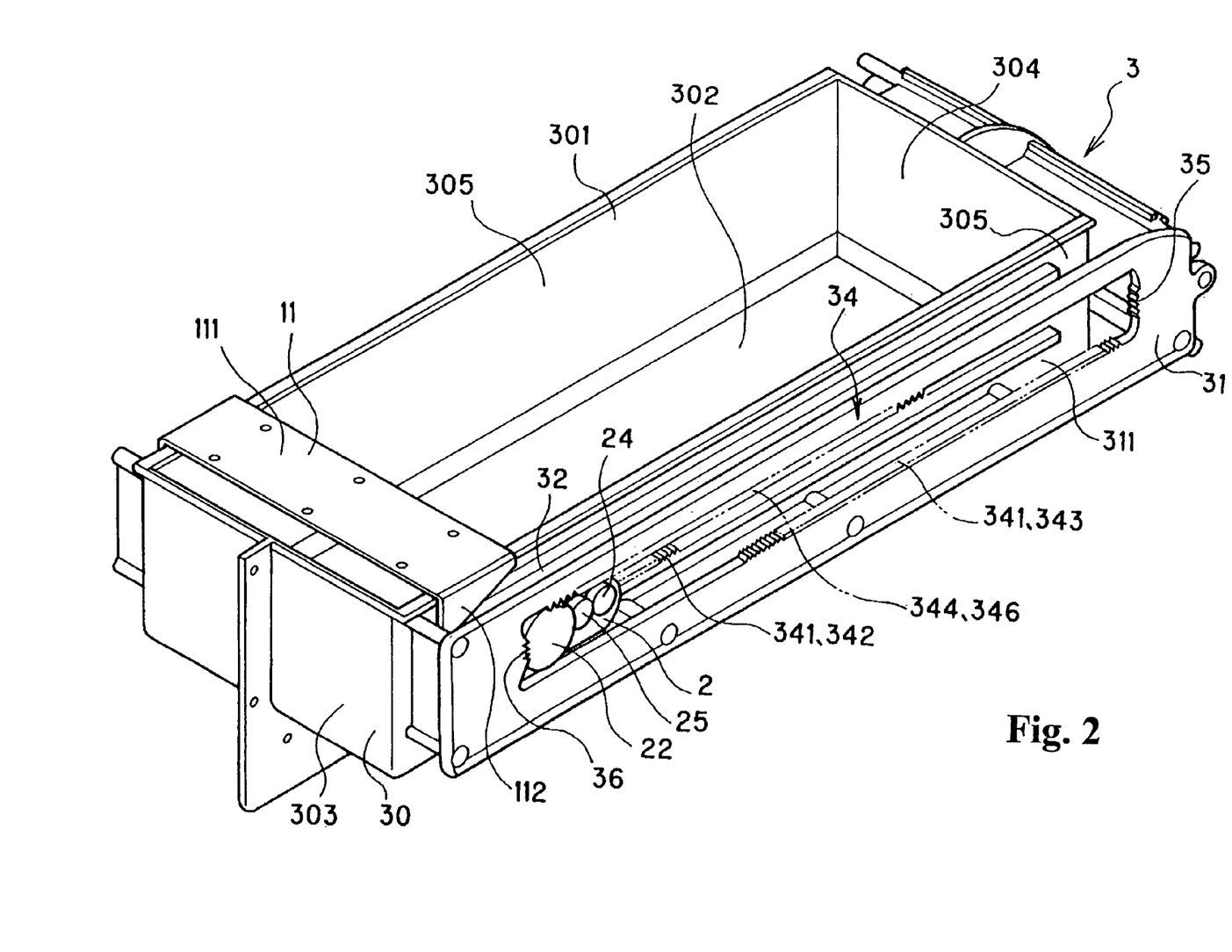
FIG. 2 is a perspective view of the operating mechanism.
Figure 3:
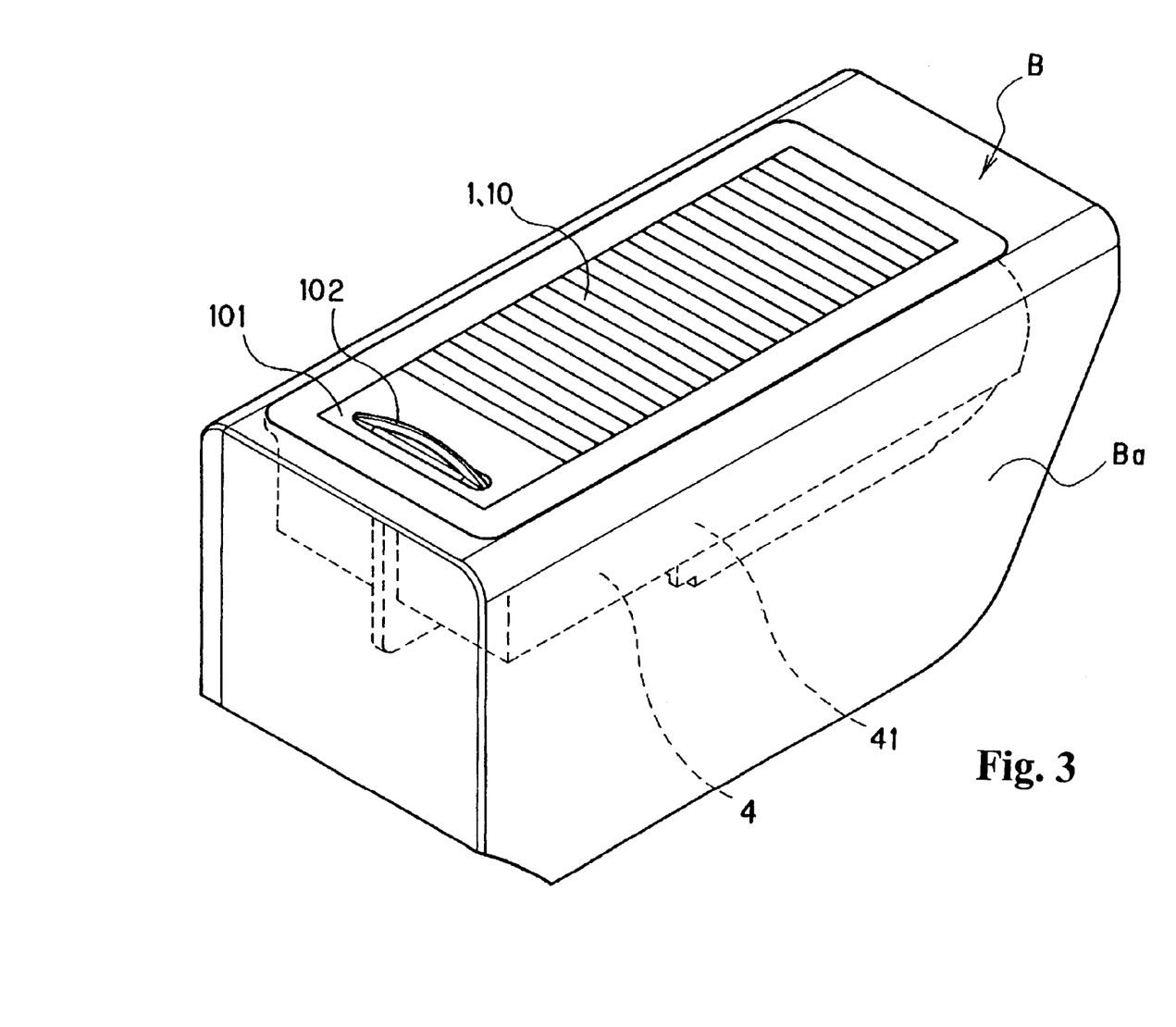
FIG. 3 is a perspective view of the operating mechanism in use.

FIGS. 1 to 3 show a box (in the embodiment, a part of a console box B disposed in a cabin of an automobile) with an operating mechanism according to the embodiment. More specifically, FIG. 2 shows an inner box 30 of a console box B. FIG. 1 shows the inner box 30 and the outer box 4 retaining the inner box 30 in a disassembled state. FIG. 3 shows the inner box 30 and the outer box 4 inserted into and installed to an outermost box Ba in a usable state.

Figure 4:
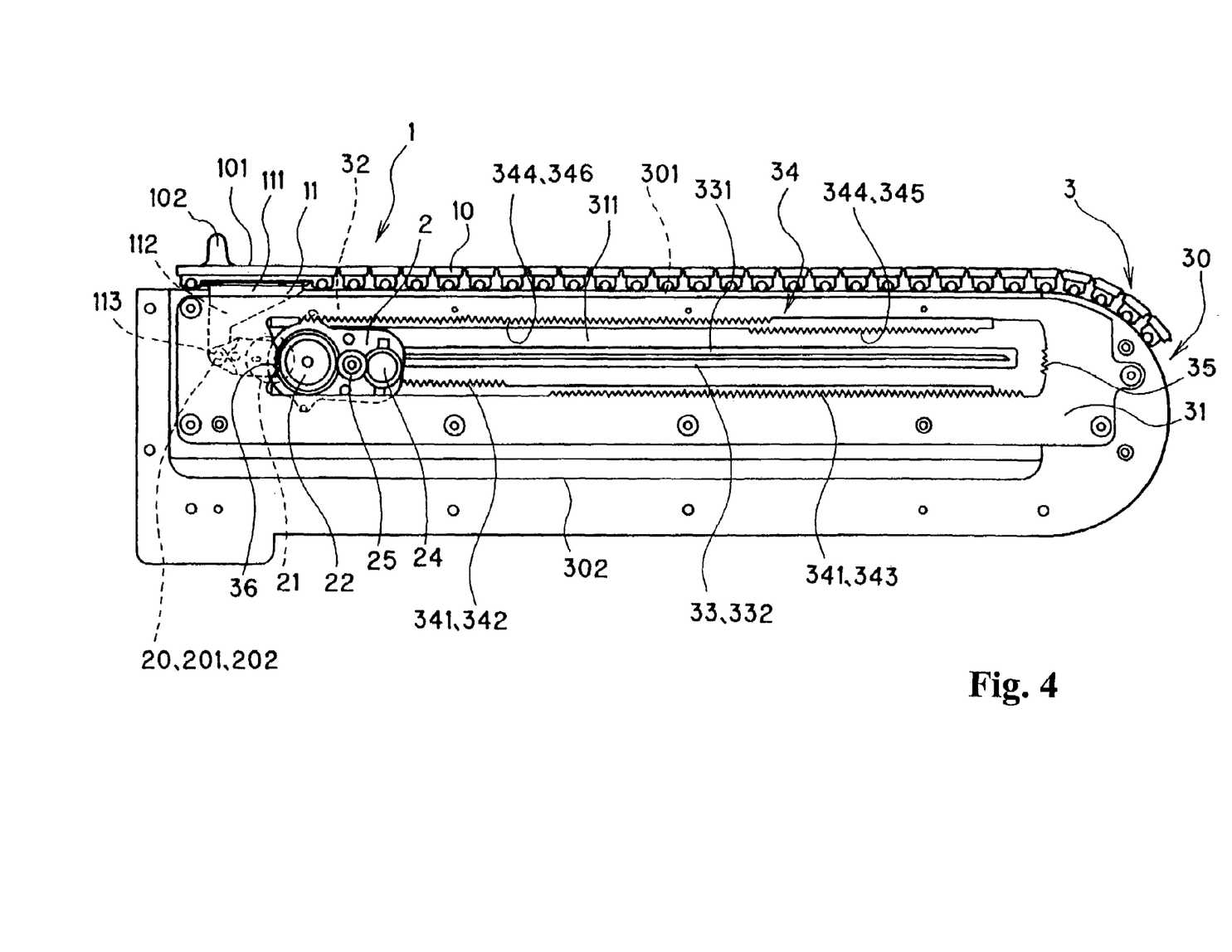
FIG. 4 is a side view of the operating mechanism.
Figure 5:
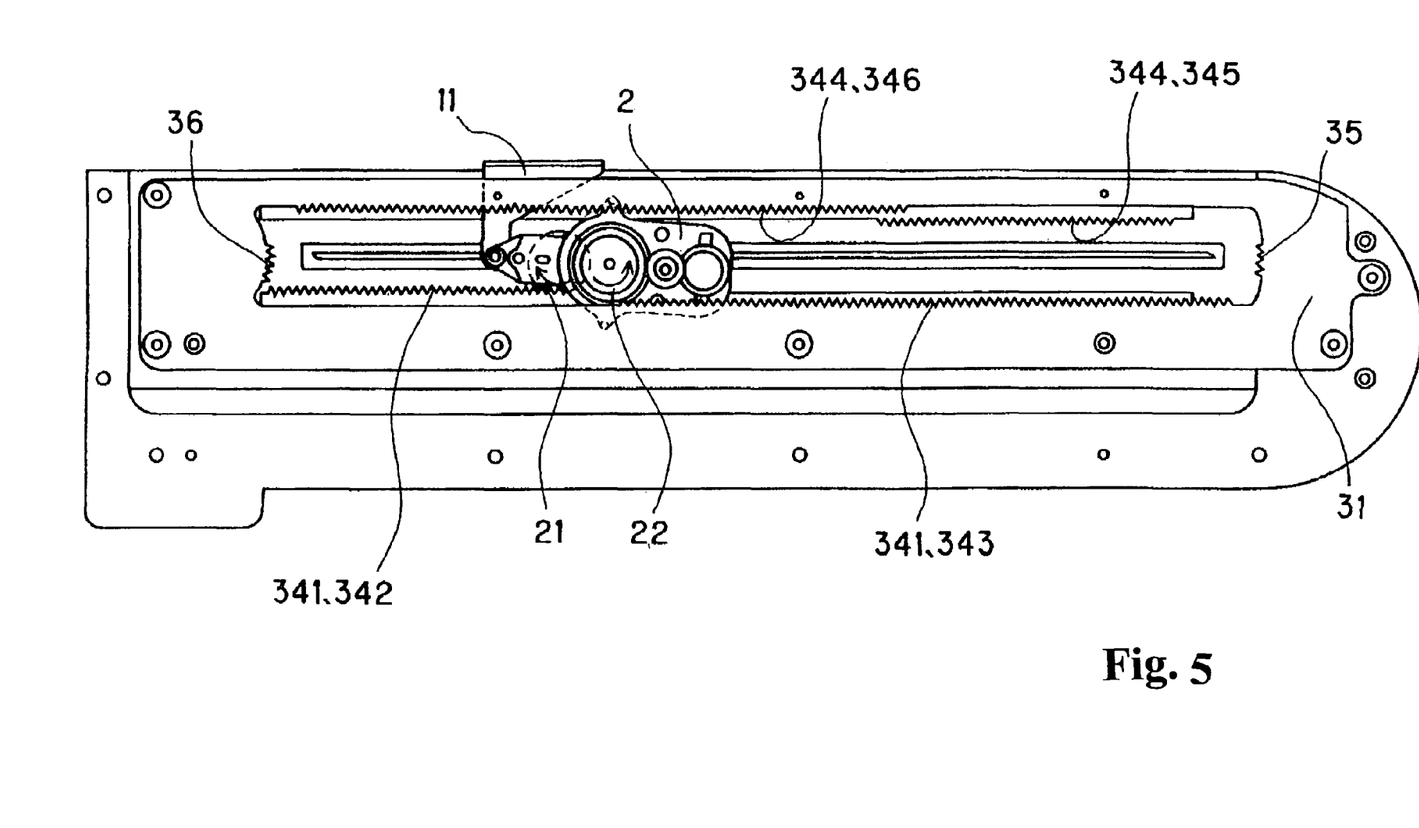
FIG. 5 is a side view of the operating mechanism.
Figure 6:
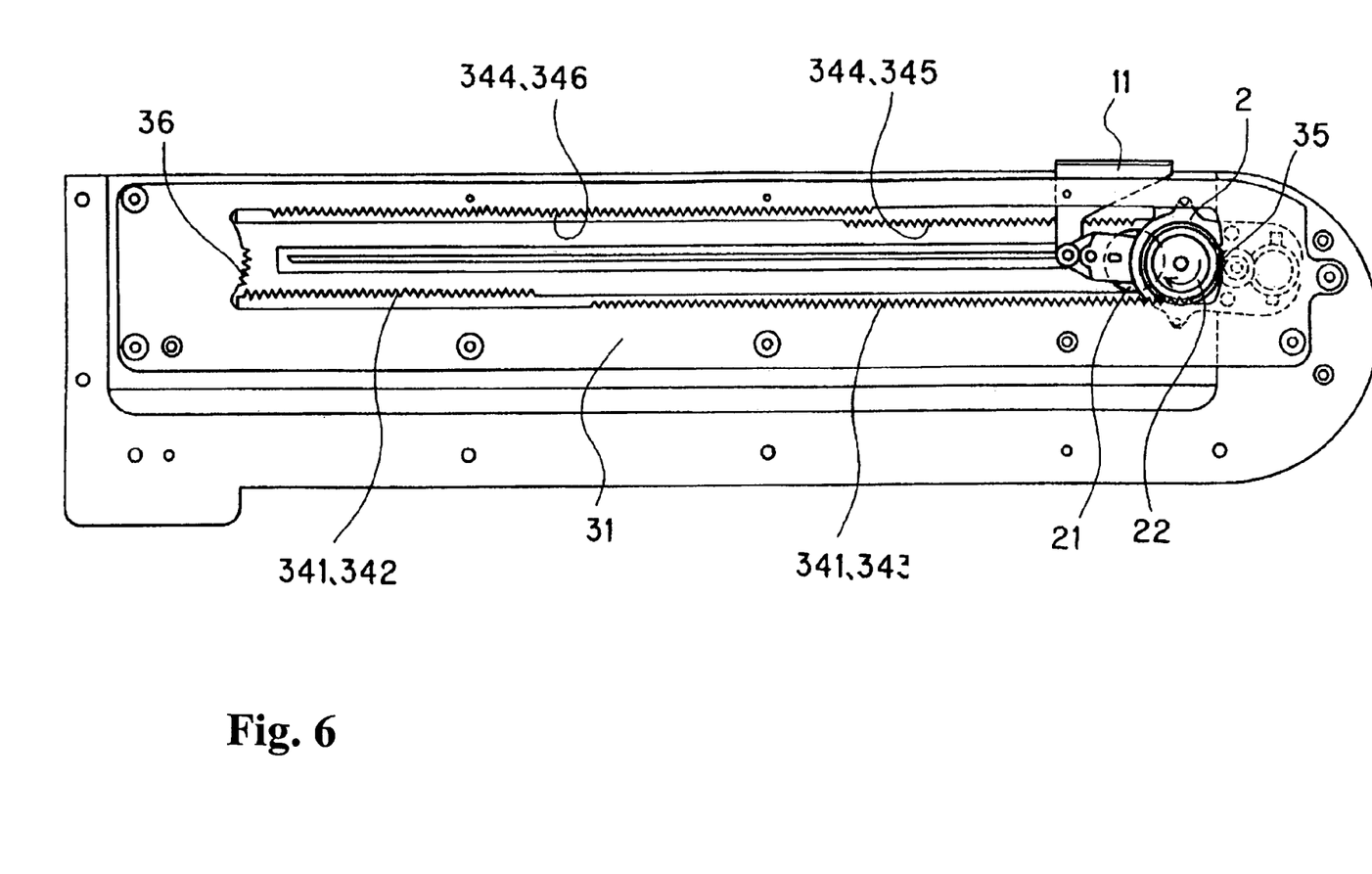
FIG. 6 is a side view of the operating mechanism.

FIGS. 4 to 9 show one of a pair of longitudinal sideboards 305 of the inner box 30 viewed from outside to explain a function of the operating mechanism for easy understanding. The moving member 2 comprising the operating mechanism moves back, as shown in the order of FIGS. 4, 5 and 6, and moves forward, in the order of FIGS. 7, 8 and 9.

Figure 10:
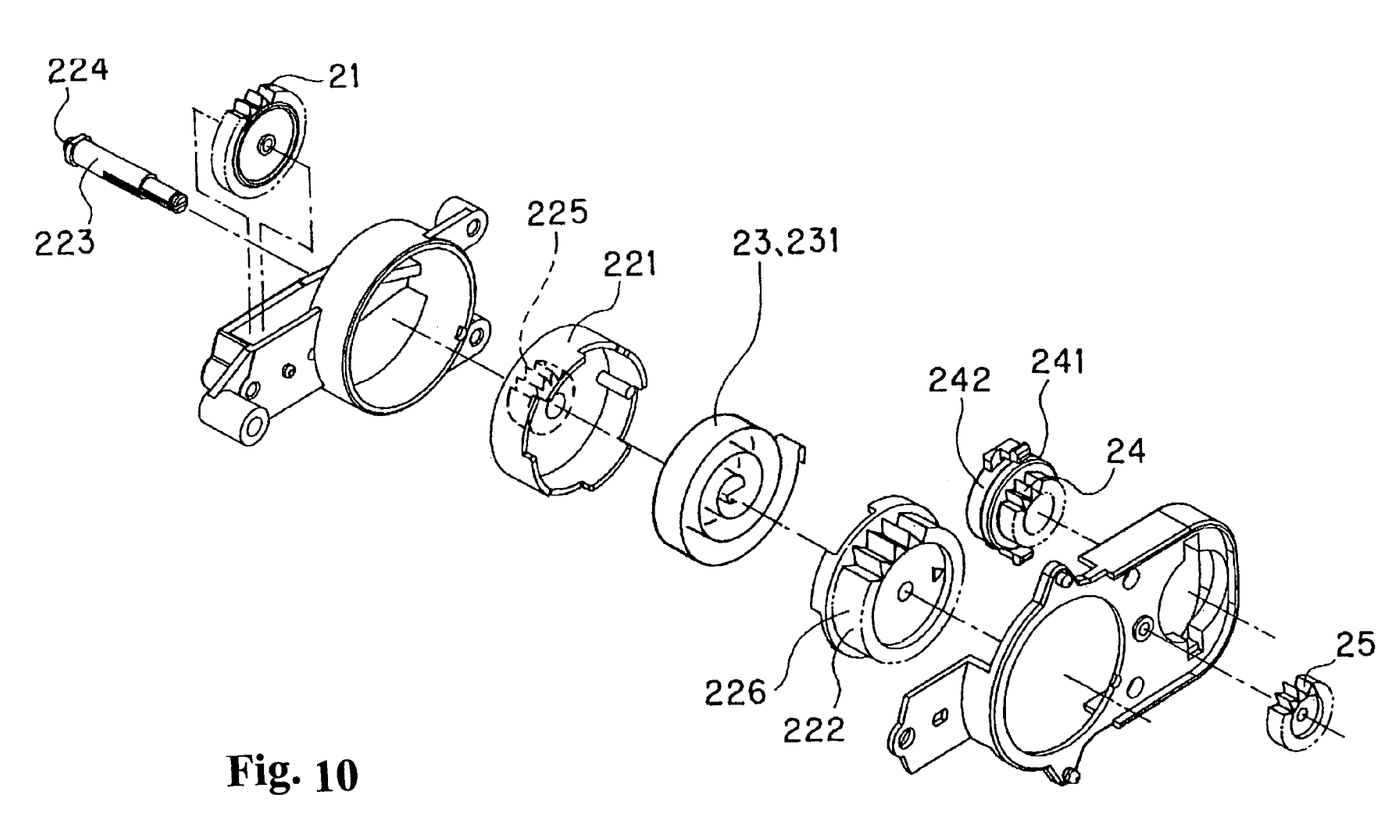
FIG. 10 is an exploded perspective view of a moving member.
Figure 11:
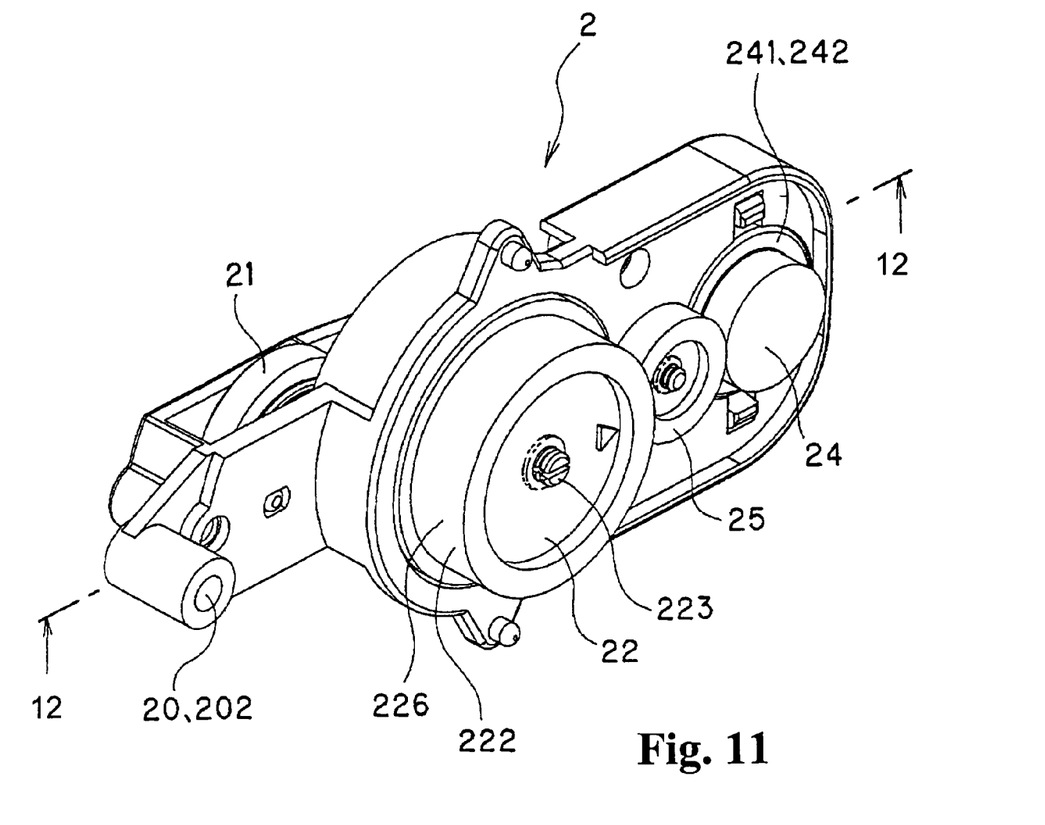
FIG. 11 is a perspective view of the moving member.
Figure 12:
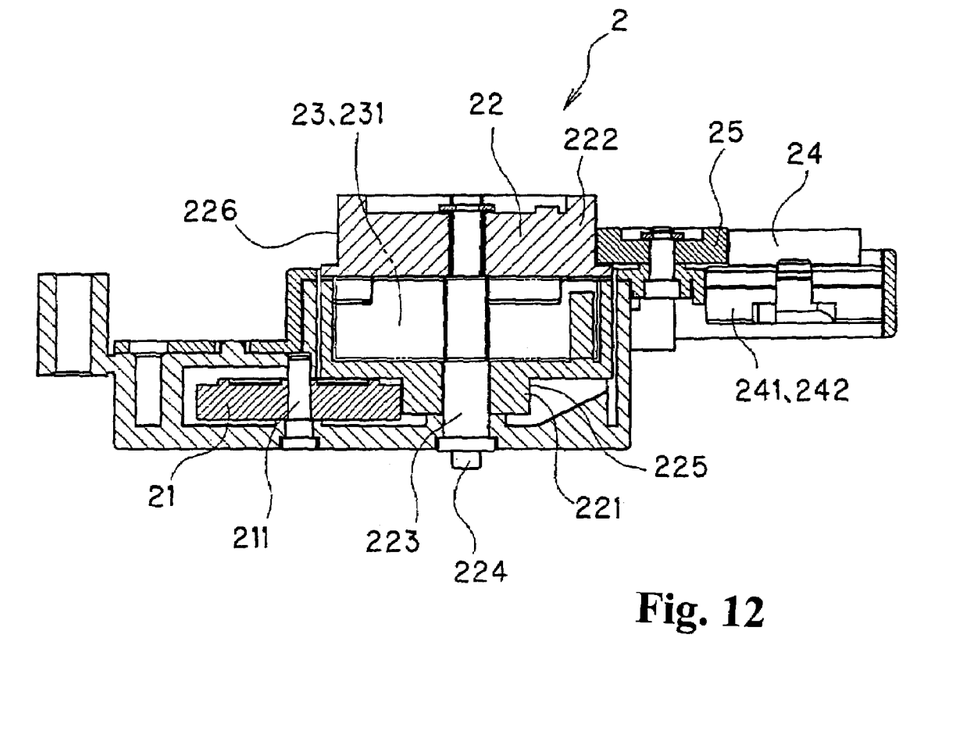
FIG. 12 is a sectional view taken along line 12—12 in FIG. 11.

FIGS. 10 to 12 show a moving member 2, respectively.

The operating mechanism in the embodiment has the moving members 2 attached to an object moving back and forth, namely, a reciprocating component 1, and a base 3 for guiding the moving members 2 to move reciprocally. The reciprocating component 1 is moved back by a backward movement of the moving members 2, and moved forward by a forward movement of the moving members 2.

The moving members 2 have mounting sections 20 for attaching the reciprocating component 1.

In the example shown in the figures, the reciprocating component 1 is a flexible sliding lid 10 that closes an elongated opening 301 of the inner box 30 in a fully moved forward position. In the example shown in the figures, the inner box 30 with an open top has a bottom board 302 and a pair of longitudinal sideboards 305 disposed between a front side board 303 and rear sideboard 304. In the example shown in the figures, moreover, the opening 301 of the inner box 30 is fully closed by the sliding cover 10 having a width and length to cover the opening 301 when a front end 101 of the sliding cover 10 is positioned at a front section of the opening 301 (the fully moved forward position). When the sliding cover 10 is fully moved back from the fully moved forward position, or a front end thereof slides to a rear side of the opening 301, the opening 301 is fully open. In the example shown in the figures, side sections of the sliding cover 10 are guided by guide grooves 42 formed in longitudinal sideboards 41 of the outer box 4 positioned outside the longitudinal sideboards 305 of the inner box 30 in order to store most of the sliding cover 10 below the bottom board 302 of the inner box 30 in the fully moved back position. In other words, in the example shown in the figures, the longitudinal sideboards 41 of the pair of outer box components 43 constituting the outer box 4 in an assembled state are each provided with a guide groove 42 comprised of an upper horizontal groove section 421 and a lower horizontal groove section 422 extending longitudinally, and a curved groove section 423 that spans between rear ends of the upper horizontal groove section 421 and the lower horizontal groove section 422. The curved groove section 423 of the guide groove 42 is curved toward a rear side. A rear end of the sliding cover 10 positioned at the rear end of the opening in the fully moved forward position is guided by the curved groove sections 423 to pass behind the rear sideboards 304 and move under the bottom board 302 of the inner box 30 as the sliding cover 10 is moved back, and, as the backward movement progresses, is gradually advanced forward under the bottom board 302. In the fully moved back position, the sliding cover 10 is stored between the inner box 30 and the outer box 4, while a portion thereof positioned between the front end 101 and the rear end is curved along the curved groove sections 423.

In the example shown in the figures, moreover, the sliding cover 10 is attached to the moving members 2 via a bracket 11 having a horizontal plate section 111 attached to the front end 101 of the sliding cover 10 and connecting plate sections 112 that bend down from right and left edges of the horizontal plate section 111. In other words, in the example shown in the figures, the connecting plate sections 112 of the bracket 11 are disposed on an outer side of each of the pair of longitudinal sideboards 305 of the inner box 30, and the moving members 2 attached to the connecting plate sections 112 with the mounting sections 20 are disposed on the outer side of the pair of longitudinal sideboards 305. The moving members 2 are guided by the guides 34 (described later). In the example shown in the figures, the moving members 2 and guides 34 having the same structures, respectively, are laid out on both sides across the longitudinal centerline of the inner box 30, so that they are symmetrical to the centerline.

The base 3 has guides 34 for the moving members 2. In the example shown in the figures, the guides 34 are formed in outer surfaces of the longitudinal sideboards 305 of the inner box 30. In other words, in this example, the inner box 30 functions as the base 3.

Each guide 34 of the base 3 has a backward path guide section 341 and a forward path guide section 344 that faces the backward path guide section 341. The moving members 2 accumulate a backward travel force while being guided by the backward path guide sections 341 and moved partially in the backward operation, and fully moves back by releasing the accumulated travel force from a mid point. The moving members 2 accumulate a forward travel force while being guided by the forward path guide sections 344 and moved partially from the fully moved back position in the forward operation, and fully move forward by releasing the accumulated travel force from the mid point.

According to the operating mechanism of this embodiment described above, therefore, the moving members 2 in the fully moved forward position are allowed to gradually accumulate the backward travel force when the backward operation of the moving members 2 is initiated by grasping or catching the reciprocating component 1 attached to the moving members 2 with a finger. From the mid point in the backward operation, the moving members 2 can run on its own by releasing the travel force, thereby allowing the reciprocating component 1 to move back by itself from the mid point in the backward operation.

Likewise, the moving members 2 in the fully moved back position are allowed to gradually accumulate the forward traveling force when the forward operation of the moving member 2 is initiated by grasping or catching the reciprocating component 1 attached to the moving members 2 with a finger. From the mid point in the forward operation, the moving members 2 can run on its own by releasing the travel force, thereby allowing the reciprocating component 1 to move forward by itself from the mid point in the forward operation.

In the example shown in the figures, the sliding cover 10, which is placed in the condition wherein the opening 301 is fully closed, moves back on its own to the position that fully opens the opening 301 after the front end 101 is partially moved backwardly by letting a finger or the like catch the tab 102 formed on of the sliding cover 10. Likewise, the sliding cover 10, which is placed in the condition wherein the opening 301 is fully open, moves forward on its own to the position that fully closes the opening 301 after the front end 101 is partially moved forwardly by letting a finger or the like catch the tab 102.

In the example shown in the figures, moreover, each moving member 2 has a first gear 21, a second gear 22 that engages the first gear 21 and is rotated in reverse by the forward rotation (clockwise in the example shown in the figures) of the first gear 21, and an accumulating device for accumulating a rotational force to allow the second gear 22 to perform the forward rotation through the reverse rotation of the second gear 22.

In addition, each of the backward path guide sections 341 of the base 3 have a backward path accumulation zone 342, which engages only the first gear 21, and a backward path release zone 343, which is located ahead of the backward path accumulation zone 342 and engages only the second gear 22. Each of the forward path guide sections 344 of the base 3 has a forward path accumulation zone 345, which engages only the first gear 21, and a forward path release zone 346, which is located ahead of the forward path accumulation zone 345 and engages only the second gear 22.

In the example shown in the figures, therefore, the moving members 2 that are fully moved forward can be manually moved to an end of the backward path accumulation zones 342 of the backward path guide sections 341, and the manual movement allows the accumulating devices 23 to accumulate the aforementioned rotational force. Past the backward path accumulation zones 342, the second gears 22 are allowed to run along the backward path release zones 343 by releasing the rotational force accumulated in the accumulating devices 23, thereby allowing the moving members 2 to fully move backward on its own.

Likewise, the moving members 2 that are fully moved back can be manually moved to the end of forward path accumulation zones 345 of the forward path guide sections 344, and the manual movement allows the accumulating devices 23 to accumulate the aforementioned rotational force. Past the forward path accumulation zones 345, the second gears 22 are allowed to move along the forward path release zones 346 by releasing the rotational force accumulated in the accumulating devices 23, thereby allowing the moving members 2 to fully move forward on its own.

In the example shown in the figures, furthermore, the moving members 2 are rotatably attached to the reciprocating component 1 using the mounting sections 20 of the moving members 2, so that the rotational centers of the first gears 21 and the second gears 22 swing about the rotatably attached position. The base 3 is provided with backward-to-forward path switching rack sections 35 formed at backward path terminals of the guides 34 thereof to which the second gears 22 bump into and engage at the position where the moving members 2 are fully moved back, thereby releasing the engagement between the backward path release zones 343 and the second gears 22 through the forward rotation of the second gears 22 and causing the swing motion in the direction to engage the first gears 21 with the forward path accumulation zones 345. The base 3 is provided with forward-to-backward path switching rack sections 36 formed at forward path terminals of the guides 34 thereof to which the second gears 22 bump into and engage at the position where the moving members 2 are fully moved forward, thereby releasing the engagement between the forward path release zones 346 and the second gears 22 through the forward rotation of the second gears 22 and causing the swing motion in the direction to engage the first gears 21 with the backward path accumulation zones 342.

In the example shown in the figures, therefore, the moving members 2 that have been fully moved back are situated to be moved forward by the subsequent forward operation. Likewise, the moving members 2 that have been fully moved forward are situated to be moved back by the subsequent backward operation.

In the example shown in the figures, a longitudinally extending rack plate 31 is mounted on an outer side of each longitudinal sideboard 305 of the inner box 30 while leaving a gap 32 from the outer surface of the sideboards 305. Longitudinally extending travel slots 311 for the moving members 2 are formed in the rack plates 31.

In the example shown in the figures, moreover, backward path accumulation zones 342 and forward path accumulation zones 345 are formed in the longitudinal sideboards 305 of the inner case facing the inside of the travel slots 311 of the rack plates 31, while backward path release zones 343, forward path release zones 346, backward-forward path switching rack sections 35, and forward-backward path switching rack sections 36 are formed in the rack plates 31.

In the example shown in the figures, the backward path accumulation zones 342, forward path accumulation zones 345, backward path release zones 343, and forward path release zones 346 are formed as the longitudinally continuous racks.

The racks corresponding to the backward path accumulation zones 342 are formed slightly above the lower edges of the travel slots 311. The racks corresponding to the backward path accumulation zones 342 begin at front ends of the travel slots 311, and end at about one third of the longitudinal length of the travel slots 311. The racks corresponding to the backward path release zones 343 are formed past the position where the backward path accumulation zones 342 end at the lower edges of the travel slots 311.

The racks corresponding to the forward path accumulation zones 345 are formed slightly below upper edges of the travel slots 311. The racks corresponding to the forward path accumulation zones 345 begin at rear ends of the travel slots 311, and end at about one third of the longitudinal length of the travel slots 311. The racks corresponding to the forward path release zones 346 are formed past the positions where the forward path accumulation zones 345 end at the upper edges of the travel slots 311.

The backward-forward path switching rack sections 35 are formed along the rear vertical edges of the travel slots 311, and the forward-backward path switching rack sections 36 are formed along the front vertical edges of the travel slots 311.

The moving members 2 are constructed so as to position the mounting sections 20 for attaching the reciprocating component 1 at the front ends, the second gears 22 substantially in the middle lengthwise, and the first gears 21 between the second gears 22 and the mounting sections 20.

In the example shown in the figures, the mounting sections 20 is constructed as mounting holes 202 for inserting pins 113 disposed at the lower ends of the connecting plate sections 112 of the bracket 11 that is inserted from above into the gap 32 between the outer surfaces of the longitudinal sideboards 305 of the inner box 30 and the inner surfaces of the rack plates 31. The pins 113 are disposed in the lateral direction, and the moving members 2 are combined with the connecting plate sections 112 so as to allow the rear ends to swing up and down about the pin axes.

The first gears 21 and second gears 22 are installed on the moving members 2, so that their axes 211 and 223, or their respective rotational centers, are substantially in parallel with the pin axes of the aforementioned pins 113.

The second gears 22 have inner ring parts 221 that engage the first gears 21 and an outer ring parts 222 that engage the racks corresponding to the backward path release zones 343, the racks corresponding to forward path release zones 346, the backward-forward path switching rack sections 35, and the forward-backward path switching rack sections 36. The second gears 22 are rotated in reverse by the forward rotation of the first gears 21 at the backward path accumulation zones 342 and forward path accumulation zones 345. The reverse rotation allows the aforementioned accumulating devices 23 to accumulate the rotational force used for the forward rotation of the second gears 22.

In the example shown in the figures, the accumulating device 23 each is comprised of a spiral spring 231 incorporated in the second gear 22.

More specifically, in the example shown in the figures, the second gears 22 are constructed as follows. The inner ring part 221 is short and tubular shaped with one tubular end open and the other end closed, and has a gear section 225 that engages the first gear 21 on the outer face of the closed end. The outer rings 222 have gear sections 226, which engage the racks corresponding to the backward path release zones 343, the racks corresponding to the forward path release zones 346, the backward-forward path switching rack sections 35, and the forward-backward path switching rack sections 36, in the outer peripheral sections. The second gears 22 are constructed by inserting the shafts 223, or the center of rotation, through the centers of the two that are so combined that the open ends of the inner ring parts 221 are closed by the outer ring parts 222.

In the example shown in the figures, moreover, the spiral springs 231 are housed within the tubes of the inner rings 221 closed by the outer ring sections 221 of the second gears 22 constructed as above, so that the outer ends of the springs 231 are fastened to the inner ring sections 221 and the inner ends of the spring 231 are fastened to the shafts 223. In addition, the forward rotation of the first gears 21 causes the reverse rotation of the second gears 22, which winds up the spiral springs 231 to accumulate the rotational force to achieve the forward rotation of the second gears 22.

Figure 7:
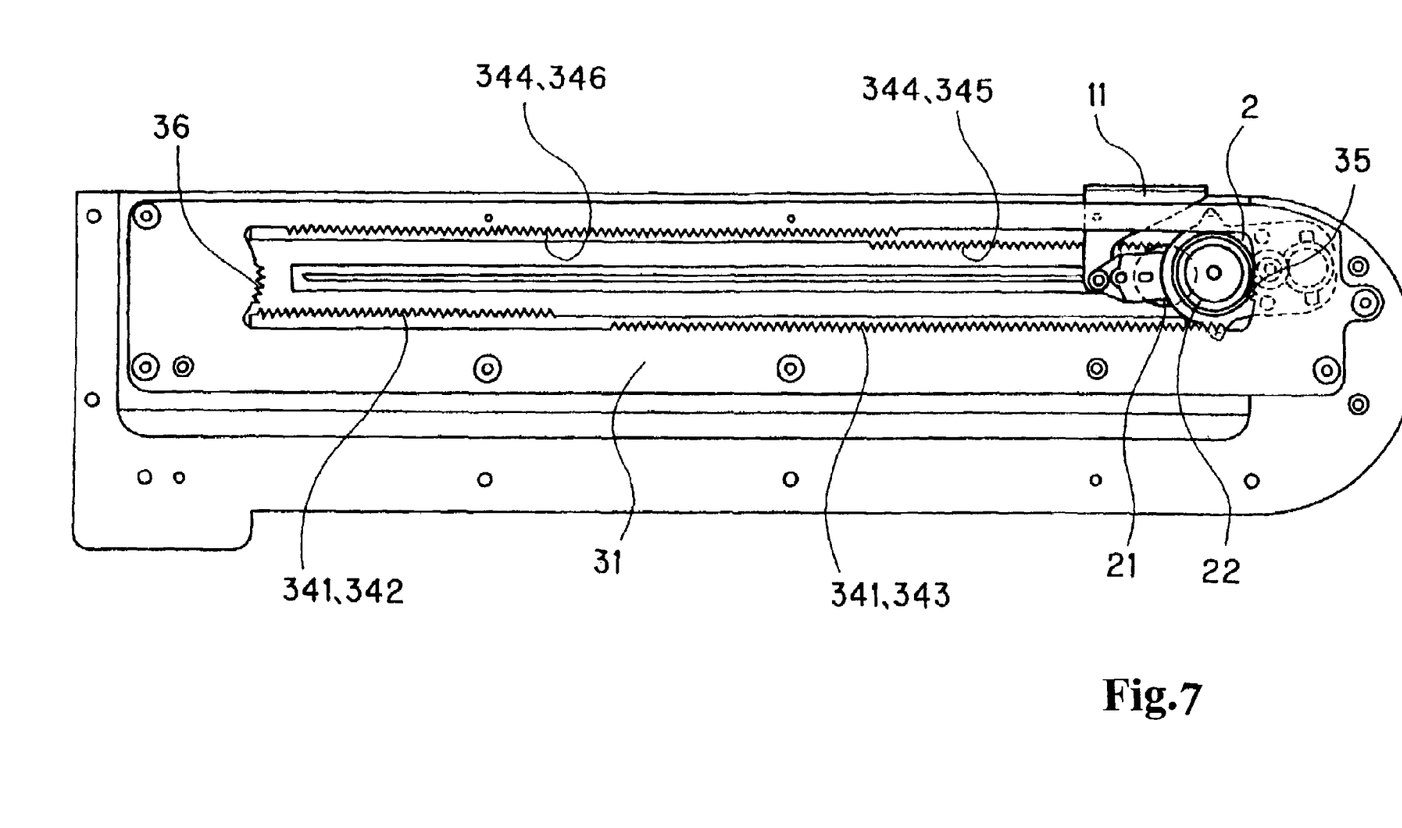
FIG. 7 is a side view of the operating mechanism.

When the moving members 2 move backward, the rear ends of the moving members 2 are dropped down. In the backward path accumulation zones 342, this condition is maintained and only the first gears 21 engage the racks corresponding to the backward path accumulation zones 342 (FIG. 4). Manually moving back the moving members 2 in this condition causes the forward rotation of the first gears 21. This causes the reverse rotation of the second gears 22 since the first gears 21 engage the inner ring sections 221 of the second gears 22, and the rotational force is stored in the spiral springs 231. Once the moving members 2 are manually moved back to the position where the engagement between the first gears 21 and the racks corresponding to the backward path accumulation zones 342 is released, the outer ring sections 222 of the second gears 22 engage the racks corresponding to the backward path release zones 343, and the first gears 21 are freed. Thus, the resilient rewinding force of the spiral springs 231 causes the forward rotation of the second gears 22 to allow the moving members 2 to move back on its own to the position where the outer ring sections 222 of the second gears 22 bump into the backward-forward path switching rack sections 35 (FIGS. 5 and 6). Once the outer ring sections 222 of the second gears 22 bump into the backward-forward path switching rack sections 35, the forward rotation of the second gears 22 lifts up the rear ends of the moving members 2 to release the engagement of the outer ring sections 222 of the second gears 22 from the racks corresponding to the backward path release zones 343, and allows the first gears 21 to engage the forward path accumulation zones 345 (FIG. 7). In the example shown in the figures, orbital cam grooves 33 are formed at the mid level between the level where the racks corresponding to the backward path accumulation zones 342 are formed and the level where the racks corresponding to the forward path accumulation zones 345 are formed, and ends 224 of the rotational shafts 223 of the second gears 22 remain inserted in the cam grooves 33. As the rear ends of the moving members 2 are lifted up as described above, the ends 224 of the rotational shafts 223 slip out of the lower groove sections 332 and enter the upper groove sections 331 of the cam grooves 33 to thereby maintain the attitude of the moving members 2.

Figure 8:
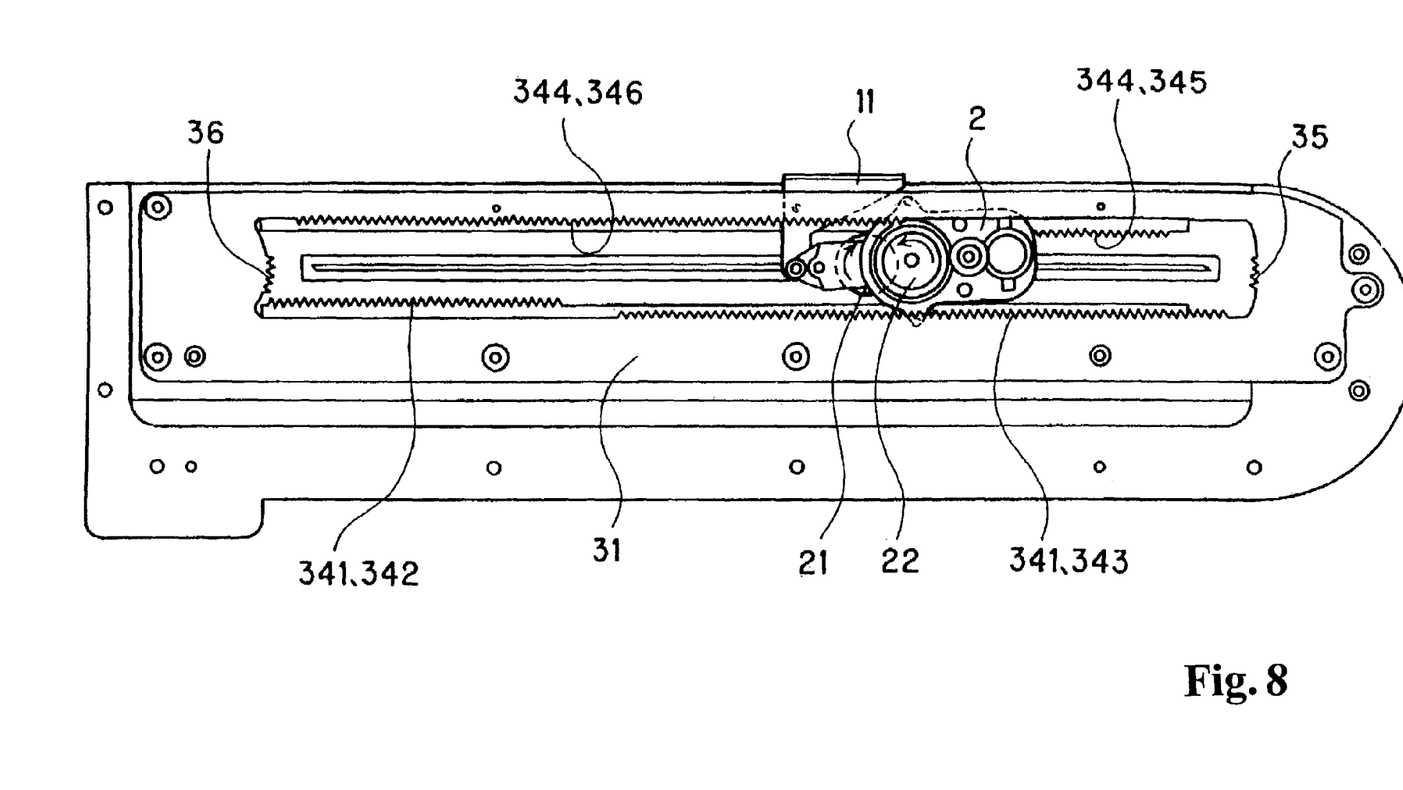
FIG. 8 is a side view of the operating mechanism.
Figure 9:
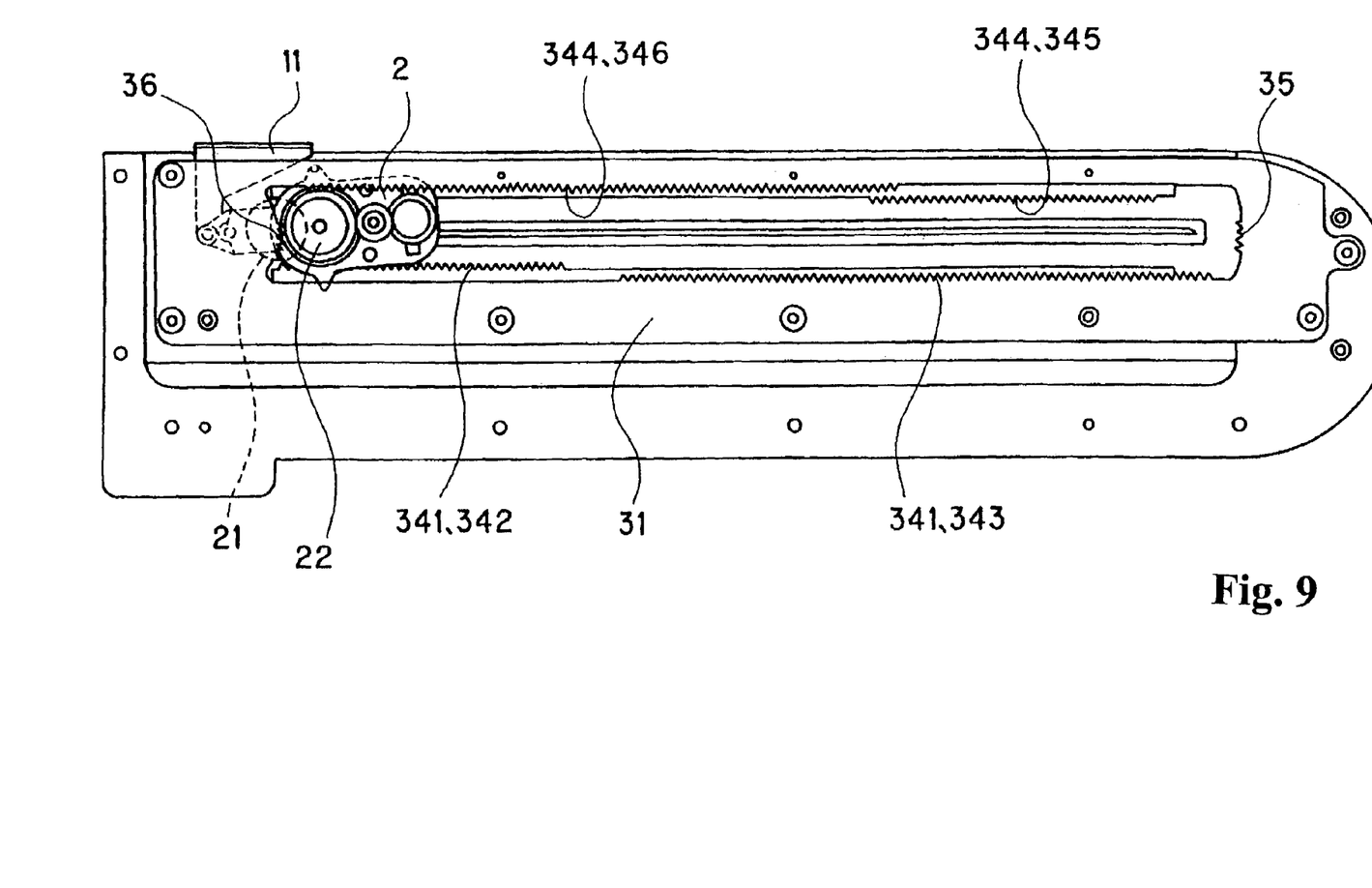
FIG. 9 is a side view of the operating mechanism.

Accordingly, when the moving members 2 move forward, in the forward path accumulation zones 345, the first gears 21 engage the racks corresponding to the forward path accumulation zones 345. Manually moving the moving members 2 forward in this condition causes the forward rotation of the first gears 21 and the reverse rotation of the second gears 22, and the rotational force is stored in the spiral springs 231 again. Once the moving members 2 are manually moved forward to the position where the engagement of the first gears 21 is released from the racks corresponding to the forward path accumulation zones 345, the outer ring sections 222 of the second gears 22 engage the racks corresponding to the forward path release zones 346, and the first gears 21 are freed. Thus, the resilient rewinding force of the spiral springs 231 causes the forward rotation of the second gears 22 to allow the moving members 2 to move forward on its own to the position where the outer ring sections 222 of the second gears 22 bump into the forward-backward path switching rack sections 36 (FIGS. 8 and 9). Once the outer ring sections 222 of the second gears 22 bump into the forward-backward path switching rack sections 36, the forward rotation of the second gears 22 drops down the rear ends of the moving members 2 to release the engagement of the outer ring sections 222 of the second gears 22 from the racks corresponding to the forward path release zones 346, and allows the first gears 21 to engage the backward path accumulation zones 342 (FIG. 4). When the rear ends of the moving members 2 drop down as described above, the ends 224 of the rotational shafts 223 of the second gears 22 slip out of the front ends of the upper groove sections 331 and enter the lower groove sections 332 of the cam grooves 33 to thereby return the moving members 2 to the initial condition.

In the example shown in the figures, furthermore, the moving members 2 each have a damping gear 24 for receiving a damping force, and a third gear 25 which engages both the damping gear 24 and the second gear 22.

In the example shown in the figures, a damper unit 241 including the damping gear 24 is disposed at the rear end of each of the moving members 2, and the third gear 25 that engages with both the damping gear 24 and the outer ring 222 of the second gear 22 is disposed between the two. The damping gears 24 and the third gears 25 are disposed so that their respective axes, or the rotational centers, are substantially in parallel with the shafts 223. The damper units 241 each has a case 242 that houses the rotational shaft of the damping gear 24 therein and contains viscous fluid, such as silicon oil, so as to dampen the rotation of the damping gear 24.

In this embodiment, therefore, the forward rotation of the second gears 22 achieved by releasing the rotational force accumulated in the accumulating devices 23 can be dampened, thereby appropriately dampening the independent backward and forward operations of the moving members 2 achieved by the forward rotation of the second gears 22.

In this embodiment, moreover, it is designed so that the second gears 22 rotate once or more, while the first gears 21 rotates only once.

In the example shown in the figures, more specifically, a diameter of the first gear 21 is larger than a diameter of the gear section 225 of the inner ring section 221 of the second gear 22.

In this embodiment, therefore, the reverse rotation of the second gears 22 is made greater than the forward rotation of the first gears 21 achieved by the engagement with the backward path accumulation zones 342 and forward path accumulation zones 345, thereby allowing the accumulating devices 23 to efficiently accumulate the rotational force. As a result, lengths of the backward path accumulation zones 342 and forward path accumulation zones 345 can be minimized.

While the invention has been explained with reference to the specific embodiments of the invention, the explanation is illustrative and the invention is limited only by the appended claims.

What is claimed is:

1. An operating mechanism for a reciprocating component, comprising:

a moving member having a mounting section to be attached to the reciprocating component, a first gear, a second gear for engaging the first gear to rotate in reverse when the first gear rotates forward, and an accumulating device for accumulating a rotational force to rotate the second gear forward when the second gear rotates in reverse, and a base having a guide for guiding the moving member to move forward and backward, said guide having a backward path guide section and a forward path guide section facing the backward path guide section so that the moving member accumulates a backward travel force when the moving member is guided along the backward path guide section to move backward to a mid point and the moving member fully moves backward with the accumulated backward travel force from the mid point, said moving member accumulating a forward travel force when the moving member is guided along the forward path guide section to move forward to the mid point and fully moving forward with the accumulated forward travel force from the mid point, wherein said backward path guide section includes a backward path accumulation zone for engaging only the first gear, and a backward path release zone located ahead of the backward path accumulation zone for engaging only the second gear; and said forward path guide section includes a forward path accumulation zone for engaging only the first gear, and a forward path release zone located ahead of the forward path accumulation zone for engaging only the second gear, wherein said moving member is rotatably attached to the reciprocating component with the mounting section of the moving member so that rotational centers of the first gear and the second gear swing about a position where the moving member is attached to the reciprocating component, and wherein said moving member further includes a damping gear for receiving a damping force and a third gear for engaging the damping gear and the second gear.

* * * * *